(12) United States Patent
Zawada et al.

(10) Patent No.: US 10,382,917 B2
(45) Date of Patent: Aug. 13, 2019

(54) SYSTEM AND METHOD FOR A BUILDING-INTEGRATED PREDICTIVE SERVICE COMMUNICATIONS PLATFORM

(71) Applicant: Riseio, Inc., San Francisco, CA (US)

(72) Inventors: Tomasz Zawada, San Francisco, CA (US); Nikita Subbotin, San Francisco, CA (US); Frank Lindner, Madrid (ES)

(73) Assignee: Riseio, Inc., San Francisco, CA (US)

( * ) Notice: Subject to any disclaimer, the term of this patent is extended or adjusted under 35 U.S.C. 154(b) by 0 days.

(21) Appl. No.: 15/860,535

(22) Filed: Jan. 2, 2018

(65) Prior Publication Data

US 2018/0192265 A1 Jul. 5, 2018

Related U.S. Application Data

(60) Provisional application No. 62/441,083, filed on Dec. 30, 2016.

(51) Int. Cl.
| | |
|---|---|
| *H04W 4/33* | (2018.01) |
| *G06N 3/08* | (2006.01) |
| *G06N 3/04* | (2006.01) |
| *H04L 29/08* | (2006.01) |
| *H04L 29/06* | (2006.01) |
| *H04W 4/029* | (2018.01) |

(52) U.S. Cl.
CPC ............ *H04W 4/33* (2018.02); *G06N 3/0427* (2013.01); *G06N 3/08* (2013.01); *H04L 63/0807* (2013.01); *H04L 67/12* (2013.01); *H04L 67/22* (2013.01); *H04L 63/00* (2013.01); *H04L 67/1097* (2013.01); *H04L 67/26* (2013.01); *H04W 4/029* (2018.02)

(58) Field of Classification Search
CPC ......... G04N 3/0427; G04N 3/08; H04W 4/33; H04W 4/029; H04L 67/12; H04L 67/22; H04L 67/26; H04L 67/1097; H04L 63/0807; H04L 63/00
See application file for complete search history.

(56) References Cited

U.S. PATENT DOCUMENTS

2015/0348049 A1* 12/2015 Todasco ............... G06Q 10/02
705/5

* cited by examiner

*Primary Examiner* — Wayne H Cai
(74) *Attorney, Agent, or Firm* — Kwan & Olynick LLP

(57) ABSTRACT

In general, certain embodiments of the present disclosure provide methods and systems for a building-integrated communication system. The system comprises a building, one or more processors, and memory. The memory includes one or more programs comprising instructions for transmitting one or more data packets over a network to one or more mobile user devices, the one or more data packets including identification information for a user; authenticating the user based on the identification information; monitoring actions of the user, wherein monitoring includes adding occurrence events and corresponding locations to a data base; and predicting a future action of the user based on the monitored actions.

20 Claims, 7 Drawing Sheets

SYSTEM AND METHOD FOR A BUILDING-INTEGRATED PREDICTIVE SERVICE COMMUNICATIONS PLATFORM

CROSS-REFERENCE TO RELATED APPLICATIONS

This application claims the benefit of U.S. Provisional Application No. 62/441,083, entitled "System and Method for a Building-Integrated Predictive Service Communications Platform," filed on Dec. 30, 2016, which is incorporated by reference herein in its entirety for all purposes.

TECHNICAL FIELD

The disclosed embodiments relate generally to digital communication systems.

BACKGROUND

With modern computing platforms and technologies being evermore integrated with the Internet, mobile device usage has become increasingly popular. Current mobile device technologies strive to provide convenience to everyday life. However, such conveniences have not yet fully extended to living in multi-unit housing. For example, today, a person still has to physically go and check if a package has been delivered to the building. Access into the building itself is usually limited to security access mechanisms that are not tied to an individual's mobile phone. In addition, information about a building and other functions are not centralized and easily accessible to tenants. Common solutions offered are inadequate because they, for the most part, are not feed-based, are non-native, are not cloud-based, and do not allow staff/resident to submit and/or process requests in real time. In addition, current solutions provide systems in which requests have to go through "request managers" and have to be approved by staff members, which is inefficient and not cost-effective. Thus, there exists a need for seamless and automated integration of building functions and information with mobile devices in order to increase convenience of living in multi-unit buildings.

SUMMARY

In general, certain embodiments of the present disclosure provide methods and systems for a building-integrated communication system. The system comprises a building, one or more processors, and memory. The memory includes one or more programs comprising instructions for transmitting one or more data packets over a network to one or more mobile user devices, the one or more data packets including identification information for a user; authenticating the user based on the identification information; and monitoring actions of the user, wherein monitoring includes adding occurrence events and corresponding locations to a database; and predicting a future action of the user based on the monitored actions.

BRIEF DESCRIPTION OF THE DRAWINGS

The disclosure may best be understood by reference to the following description taken in conjunction with the accompanying drawings, which illustrate particular embodiments of the present disclosure.

DESCRIPTION OF EMBODIMENTS

It will be understood that, although the terms "first," "second," etc. may be used herein to describe various elements, these elements should not be limited by these terms. These terms are only used to distinguish one element from another. For example, a first contact could be termed a second contact, and, similarly, a second contact could be termed a first contact, without changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular embodiments only and is not intended to be limiting of the claims. As used in the description of the embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Reference will now be made in detail to various embodiments, examples of which are illustrated in the accompanying drawings. In the following detailed description, numerous specific details are set forth in order to provide a thorough understanding of the present disclosure and the described embodiments. However, the present disclosure may be practiced without these specific details. In other instances, well-known methods, procedures, components, and circuits have not been described in detail so as not to unnecessarily obscure aspects of the embodiments.

Figure 1A:
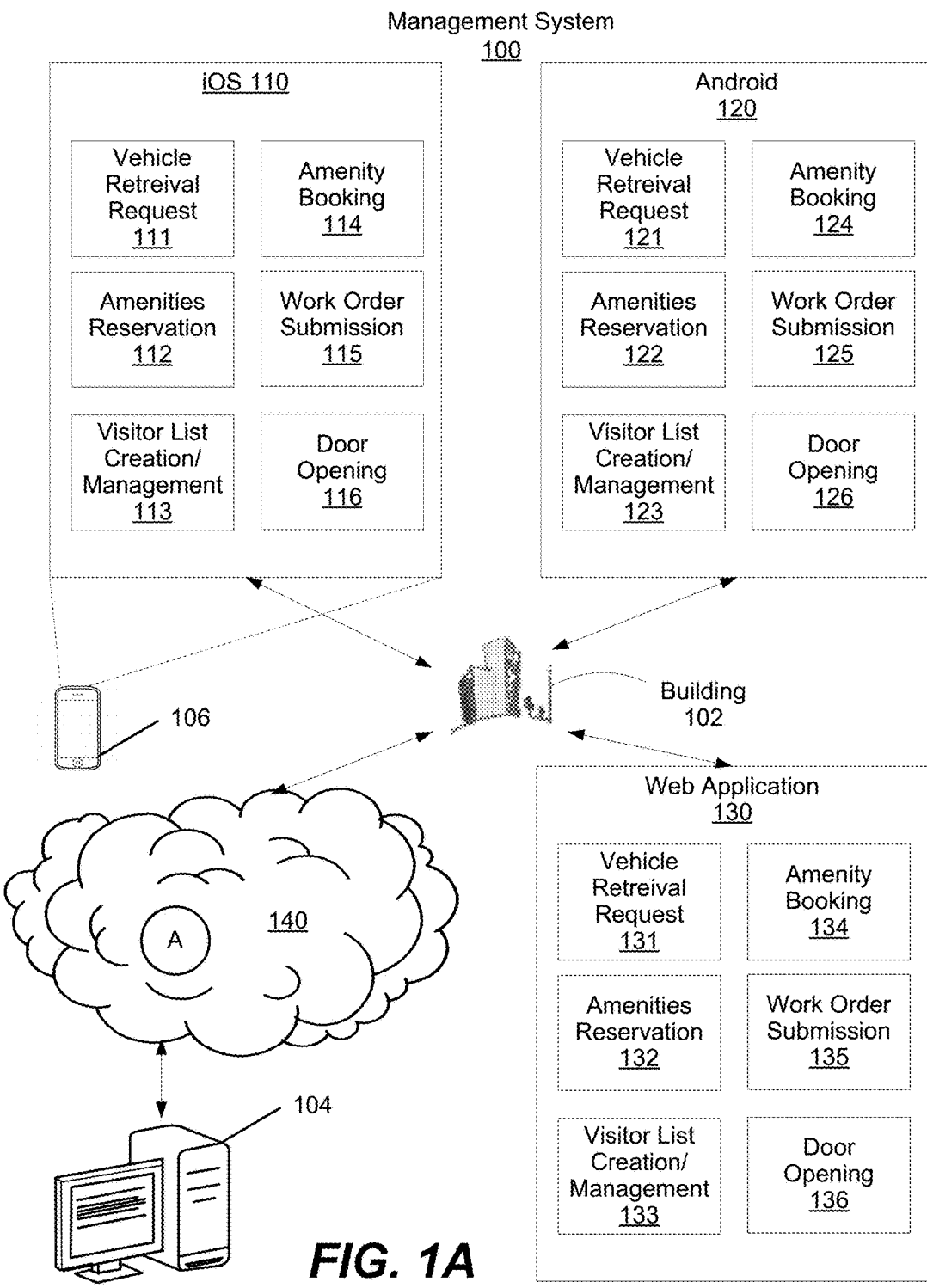
FIGS. 1A-1B illustrate an block diagram of an example building-integrated system, in accordance with various embodiments of the present disclosure.
Figure 1B:
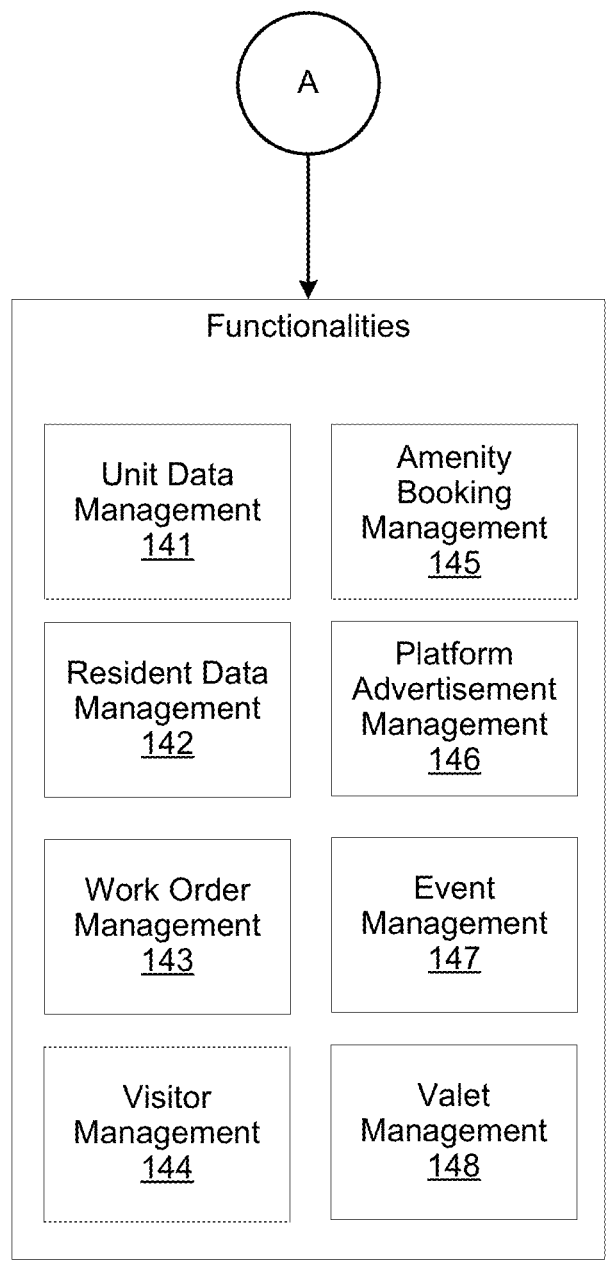

FIGS. 1A-1B illustrate an block diagram of an example building-integrated system 100, in accordance with various embodiments of the present disclosure. System 100 includes building 102, iOS 110, Android 120, Web Application 130, and cloud-based management system 140.

In some embodiments, iOS 110 is implemented on a user device 106. In some embodiments, iOS 110 provides the user with an interface configured to communicate with other users, cloud 140, or even building 102. iOS 110 includes various functions implemented through separate modules. In some embodiments, the functions/modules include vehicle retrieval request 111, amenities reservation 112, visitor list creation/management 113, amenity booking 114, work order submission 115, door opening 116.

In some embodiments, system 100 also includes Android 120. In some embodiments, Android 120 is implemented on a user device. In some embodiments, Android 120 provides the user with an interface configured to communicate with other users, cloud 140, or even building 102. Android 120 includes various functions implemented through separate modules. In some embodiments, the functions/modules include vehicle retrieval request 121, amenities reservation 122, visitor list creation/management 123, amenity booking 124, work order submission 125, door opening 126. In various embodiments, the functions and modules in Android 120 are analogous to the functions and modules previously described for iOS 110.

In some embodiments, users may not have access to a mobile device and thus would require access to the private system via a Web Application 130. In some embodiments, Web Application 130 provides the user with a web-based interface configured to communicate with other users, cloud 140, or even building 102. Web Application 130 includes various functions implemented through separate modules. In some embodiments, the functions/modules include vehicle retrieval request 131, amenities reservation 132, visitor list creation/management 133, amenity booking 134, work order submission 135, door opening 136. In various embodiments, the functions and modules in Web Application 130 are analogous to the functions and modules previously described for iOS 110. However, in other embodiments, since Web-based applications may not be as effective for authenticating a user for entrance into building 102, web application 130 may not have door opening 136 function.

In some embodiments, system 100 includes backend cloud-based management system 140. In some embodiments, cloud 140 is implemented using one or more servers 104. As with the other components of system 100, cloud 140 includes many individual modules for carrying out certain functions. FIG. 1B illustrates some of the different functions/modules included in example cloud 140. In some embodiments, cloud 140 includes unit data management 141, resident data management 142, work order management 143, visitor management 144, amenity booking management 145, platform advertisement management 146, event management 147, and valet management 148.

System Infrastructure Components

Figure 2:
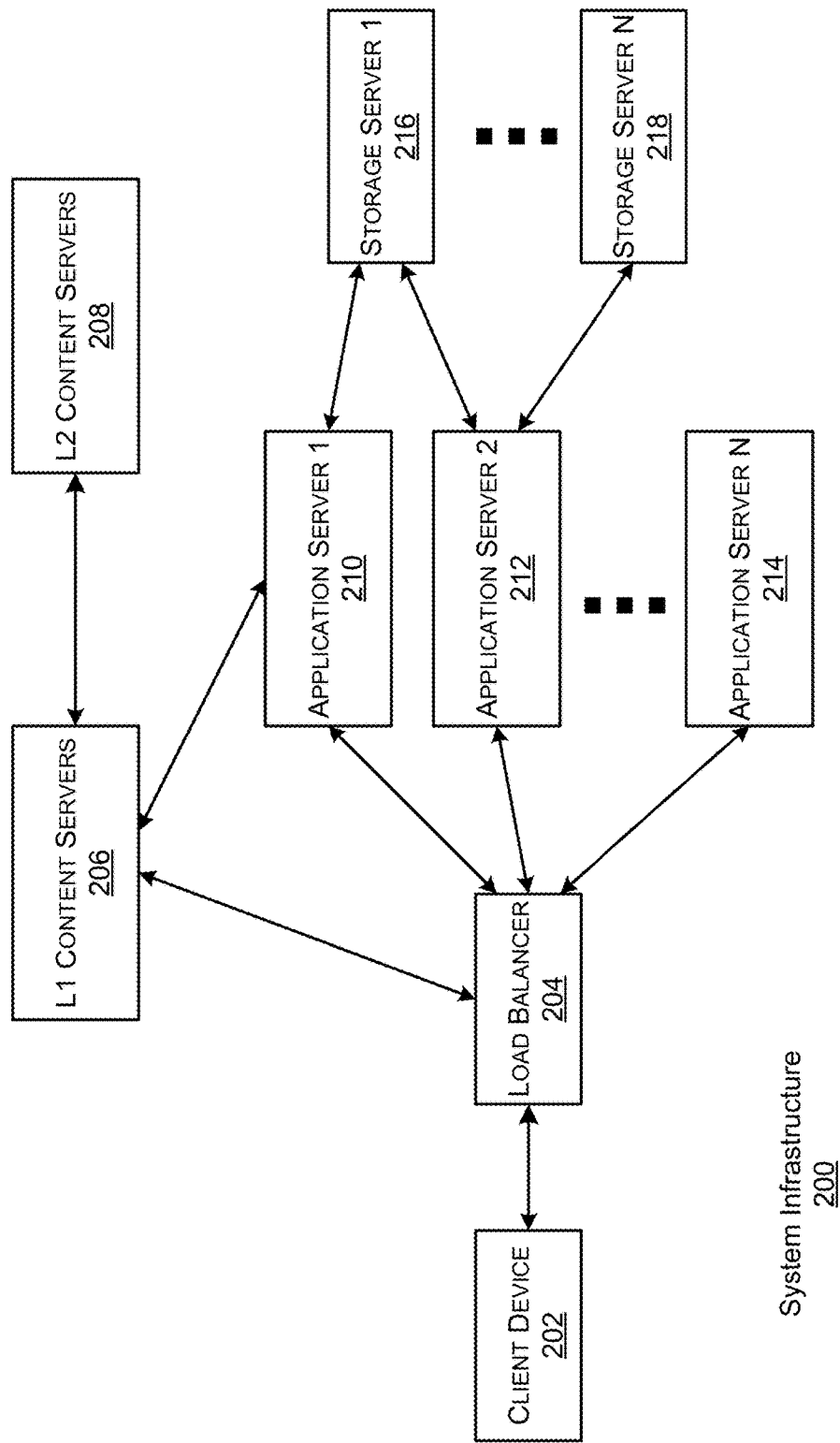
FIG. 2 illustrates a block diagram of an example system infrastructure, in accordance with various embodiments of the present disclosure.

FIG. 2 illustrates a block diagram of an example system infrastructure, in accordance with various embodiments of the present disclosure.

In various embodiments, the system infrastructure 200 includes a client device 202 that connects to a backend cloud, such as cloud 140, over the internet.

In some embodiments, client device 202 is a mobile phone, computer, or any mobile device running a mobile app, such as an iOS or Android device, or a Web interface browser. In some embodiments, a user has to authenticate himself into the system and then has access to the centralized information and services, all on the same client device 202. In some embodiments, the backend cloud is a distributed system that's includes a load balancer 204, L1 (206) and L2 (208) content servers, application servers (210, 212, and 214), and storage servers (216 and 218).

Authentication

Figure 3:
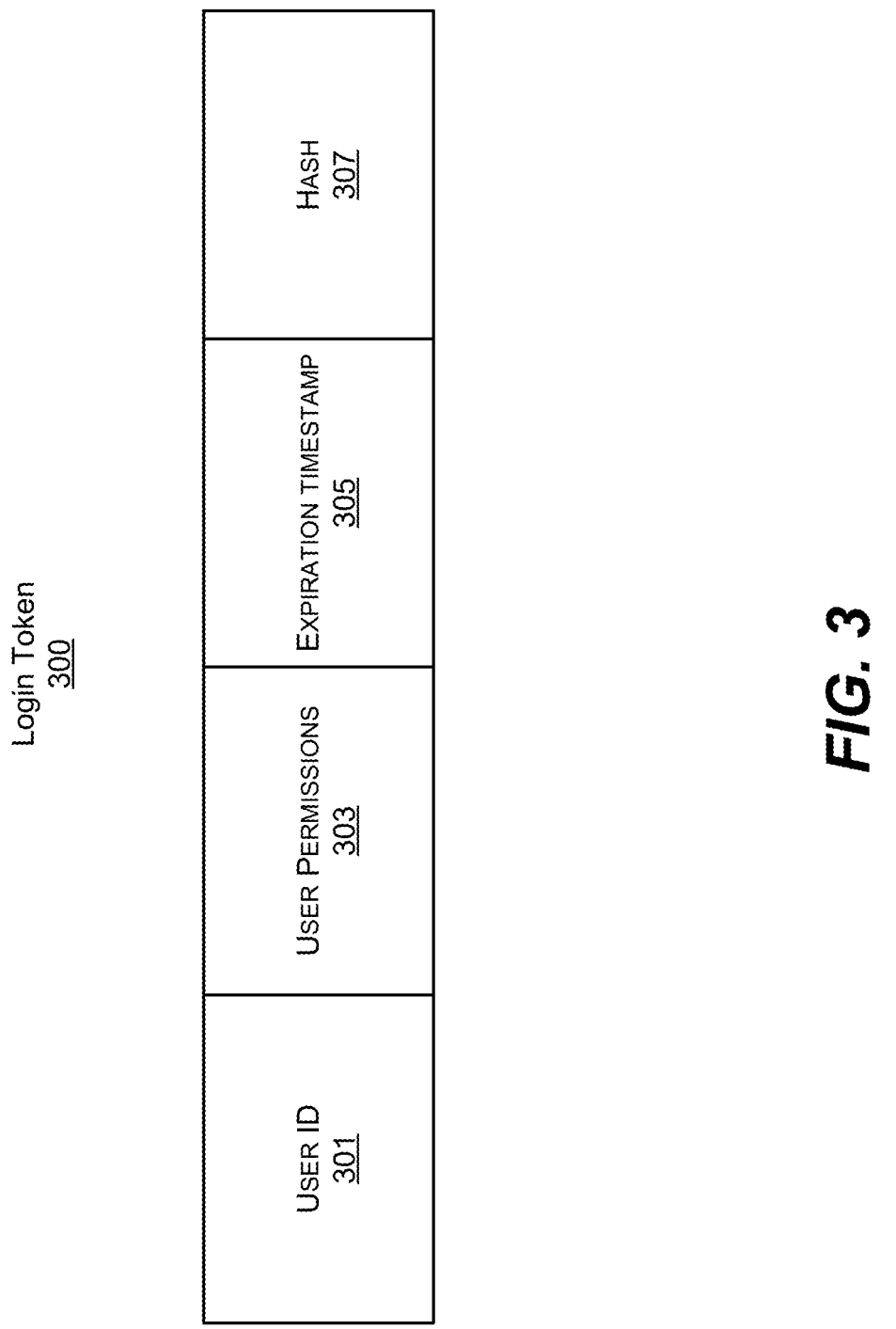
FIG. 3 illustrates an example login token, in accordance with various embodiments of the present disclosure.

In various embodiments, authentication is a key component into accessing a private network. FIG. 3 illustrates an example login token 300 used for authentication, in accordance with various embodiments of the present disclosure. In some embodiments, login token 300 is a data structure storing key value fields for authentication. In some embodiments, token 300 includes user ID field 301, user permissions field 303, expiration timestamp 305, and hash 307. In some embodiments, timestamp 305 represents an expiration time for the token, which can be represented in Unix milliseconds.

In various embodiments, once the user provides the login details to the application servers, these generate a login token with the user identification, an expiration date for the token, user privileges for the system and a hash of all the previous information. In some embodiments, the hash is computed using HMAC-SHA256.

In various embodiments, hash 307 is generated using a private key that the application server holds. In such embodiments, this has multiple advantages. First, it ensures that only the application servers can change the content of the token and if any third party attempts to do so, the application servers will be able to detect it. Second, the token content is open and the client device can access the user id and permissions, which provides a large advantage over other implementations. In some embodiments, the client device is able to store user credentials encrypted locally on the client device. The user can then transparently access the locally stored token when needed. In such embodiments, the client device is configured to automatically request (or request when necessary) a new token when the token expirations date/time has passed. In some embodiments, the client device supports fingerprint authentication to unlock access to the encrypted credentials or the token.

Communication

In some embodiments, the client device communicates with the server sending TCP/IP or UDP packets of data. More specifically HTTP could be used. In embodiments utilizing the cloud, the cloud offers a REST API (with GET, POST, DELETE, PATCH and UPDATE) that produces JavaScript Object Notation content. In some embodiments, the client device is able to receive these packets of data, join them together and parse the information from them. In some embodiments, the packets are transmitted over a wireless communication technology like WiFi or 4G.

Real Time

In some embodiments, cloud system 140 aggregates all the content and generates millions of unique feeds in real time. In certain embodiments, a push notification is sent to the client device and this retrieves the information from the cloud. In such embodiments, this "push-pull" model minimizes bandwidth and optimizes battery life of the client devices. In some embodiments, the system senses whether a client device is already authenticated/logged in to the private network. In such embodiments, new notifications are not pushed to the client device if the device is detected and determined to be logged in to the network. In some embodiments, the frequency/method of delivery for the "push-pull"

model can be modified according to user preferences or location information (e.g. GPS location).

Aggregation

In some embodiments, cloud backend system 140 aggregates information from different sources, e.g. databases, network storage, and the Internet. In some embodiments, for services and requests, system 140 is able to integrate and transact with third party systems over the Internet to provide a unified API of capabilities for a specific location. In such embodiments, this process is independent and transparent of the actual provider of the service. In some embodiments, the cloud handles all transaction in real time and is able to retry unsuccessful operations until they succeed or fail.

Cloud Deployment

In some embodiments, cloud 140 is a distributed network of servers 104 deployed in multiple geographical regions. In some embodiments, one optimization is to deploy cloud servers on both coasts of United States, central Europe, Australia, and South Asia. In various embodiments, cloud servers 104 are always close to main optic fiber deployments, to minimize the latency between the client device and the server.

Client Mobile Device Interface

In various embodiments, the client interface includes: centralized access to all the data related to a place (e.g. building 102), its properties and services; one or more feeds of data personalized for a user for that current place; and one or more pages about the user and services related to the user. In some embodiments, the centralized information relating to a place is combined in a unified page with information like: name of the place, a photo or video of it, contact details (phone, email, SMS), amenities or special features related to the place, services offered in that place, fitness events in that place, food and good ordering in that location.

In some embodiments, the feed is specially crafted for every user from all the public events happening at that location/building and all the private events, requests, and actions occurring at that location/building that are private to the user. In some embodiments, the feed is ranked using a machine learning technique to optimize the order having the most relevant content first. In some embodiments, the feed is unique to every user and every user has a unique feed. In some embodiments, different users have different permission levels and the feed is crafted to respect and use this.

In various embodiments, the user interface includes a page about the user and the actions the user can take in a specific place. In such embodiments, this page contains the information about how the user is linked to the place and what kind of relationship they have. In various embodiments, certain places will contain actions, e.g. pay rent, request improvements, or add another user that will have access to the place.

Client Web Interface

In some embodiments, the system also includes a web interface that serves users, as well as places admins. In such embodiments, this web interface provides access to all the functionality relevant to the place/building. In some embodiments, it also has search and browsing for users that are linked to the place/building and that have access to it.

Action Predictions

In various embodiments, the system or client device is able to learn the actions that the user performs over time. In some embodiments, this is based on a rule based model and an advanced version of it on machine learning techniques. For the rule based model, certain factors such as the time of day, the day of the week, the weather, the location of the user, the frequency with which the user accesses certain functions or applications (e.g. over a threshold amount), and the frequency and commonality of the user's actions right after certain trigger events (e.g. opening the door) are factored into a predictive algorithm. In some embodiments, the predictive algorithm outputs a score. In some embodiments, the client device interface automatically puts into action any "predicted" actions with a score above a certain threshold. In such embodiments, there is a section in the client device interface that predicts the actions that the user would like to do perform in the current location. In some embodiments, predictions are partially based on occurrences or events at different locations, or the time of day and weather.

In some examples, the client device interface can remember applications frequently accessed by a user when the user enters the building and provide the applications automatically when the user enters the building. In another example, the client device interface can recognize that the user often scrolls down immediately after accessing "Amenities Reservation" and provide several pages of scroll down Amenities Reservation information to a user preemptively even before the user performs any scrolling. However, if the user almost never scrolls down, then the client device interface recognizes this pattern of behavior and then does not download scroll down pages in order to save resources, storage space, and time. Thus, the client device interface recognizes user behavior pattern and then predicts the services that are needed, including predicting what not to do, based on past user behavior, in order to make the systems and mobile devices run more efficiently (e.g. not waste resources and storage on actions that are not predicted to be needed). In still other examples, the client device interface can recognize user viewing or listening patterns during different times of the day and preemptively download media content information believed to be of interest to a user. Similarly, the client device interface can determine times when certain functions or modules of the application are frequently accessed and provide preloaded and dynamically updated data for those particular functions/modules based on frequency of viewing or the time of day. For example, if the user always accesses "Visitor List" on the weekends, then the client device interface would recognize this pattern and pre-load up-to-date data on the visitor list (because the visitor list is dynamic and always updating) onto the user's personal device. A wide variety of algorithms can be implemented to intelligently select portions of application data for download to a mobile device without having to download the entire library of data. Resources can be conserved while still providing the user with an active and dynamic experience.

Machine Learning

According to various embodiments, the system may include an advanced neural network for predicting the actions of the user. In some embodiments, the neural network may use a labeled dataset to train the parameters of a neural network so that the neural network can accurately output correct predictions of actions that the user has not yet performed. In some embodiments, examples of items in the dataset are the monitored actions and event occurrences identified and stored by the building system. In some embodiments, the labeled dataset includes information regarding different locations, time of day and weather, and the date.

According to various embodiments, the neural network may operate in two modes. The first mode may be a "training" mode in which the initial parameters, which start from random values, are slowly updated by user confirmation of predicted events. In some embodiments, the initial parameters updated, or trained, by stochastic gradient descent, which slowly updates the initial random values of parameters such that the neural network outputs increasingly accurate predictions. The second mode may be an "inference" mode in which the neural network applies the updated parameters to predict actions based on new location and data. In some embodiments, the predictions using new information that the neural network has never seen can also be an educated "inference" based on the similarity of variables in past datasets already processed by the neural network. In some embodiments, the training mode and the inference mode run simultaneously, with each mode helping the other. For example, in such embodiments, new occurrence events are fed into the training mode to be used for future inference predictions. Similarly, inference predictions are assessed and confirmed by the user and used as feedback to further sharpen the training mode.

According to various embodiments, the neural network may comprise multiple layers, including a convolution-nonlinearity step and a recurrent step that are implemented in both the training mode and the inference mode. In some embodiments, the convolution-nonlinearity step transforms input into tensors that the neural network may use to forward pass through the layers. In some embodiments, the recurrent step translates the tensors from the convolution-nonlinearity step into the predictions. Each step comprises a number of different computational layers. A "layer" refers to a mathematical function which has one or more input tensors and one or more output tensors. In some embodiments, a layer may include one or more tensors of parameters which are updated, or trained, using a stochastic descent algorithm. Such computational layers may include convolutional layers, rectified-linear layers, and linear layers. In other embodiments, other various layers may be implemented in the neural network. In some embodiments, the network may be built from a sequence of layers, with the output from one layer feeding in as the input to the next layer.

Specialized Server

In some embodiments, the system 100 uses specialized servers to deliver multimedia images and videos to the user in the fastest way. In such embodiments, the system includes L1 (206) and L2 (208) content servers. In some embodiments, L1 content servers 206 are strongly specialized in RAM DDR2000 memory. They have an optimized hashmap in memory that maps from an URL to image objects. In some embodiments, L2 content servers 208 are strongly optimized in disk space. In some embodiments, when an image is not found in the in-memory hashmap, a fallback request is performed to L2 content servers 208 that contain all the media content in a disk cache. In various embodiments, L1 servers 206 are deployed close to the user geographically to minimize the latency and maximize the perceived speed. In some embodiments, for unlocking doors we use custom made Bluetooth or NFC locks that connect to phone 106 via a SSL encrypted connection. The first step is to retrieve the door token from distributed cloud storage 140. Then the token is presented to the door lock via Bluetooth or NFC. The token is encrypted with AES256, AES 512 or AES1024 using a private key that only the lock has. In other embodiments, the locks on doors are controlled remotely through a cellular network. In such embodiments, the user is first authenticated, then sends a request to unlock the doors via mobile device 106. Once the request is received and processed by the system, the system determines whether the user of the mobile device is authorized to open the door at the particular time and location. If user is authorized, then the system will proceed with unlocking the door. Still in other embodiments, the locks are controlled via the Internet or a combination of NFC, Bluetooth, cellular network, and Internet.

In some embodiments, the system includes a news board at the entrance of the building. In such embodiments, the news board is updated constantly during the day. In some embodiments, the news board provides information only, meaning it is not a portal for inputting requests to be handled or processed by the system.

Advantages

As described above, the systems and methods described in the present disclosure provide for an all-in-one building communications solution that centralizes data, management, and interaction within a single place. Such a system allows for staying up to date with everything related to a particular place and requesting different services supported by the place. In various embodiments, just some of the advantages of a system of the present disclosure include: unparalleled security, streamlined resident-staff communication, increased resident retention, shortened maintenance cycles, potential full key elimination, efficient cloud-based solutions, native iOS and Android user-facing (resident) mobile apps, predictive service functionality, and multiple (over 30) APIs available for easy, "plug&play" integration.

Figure 4:
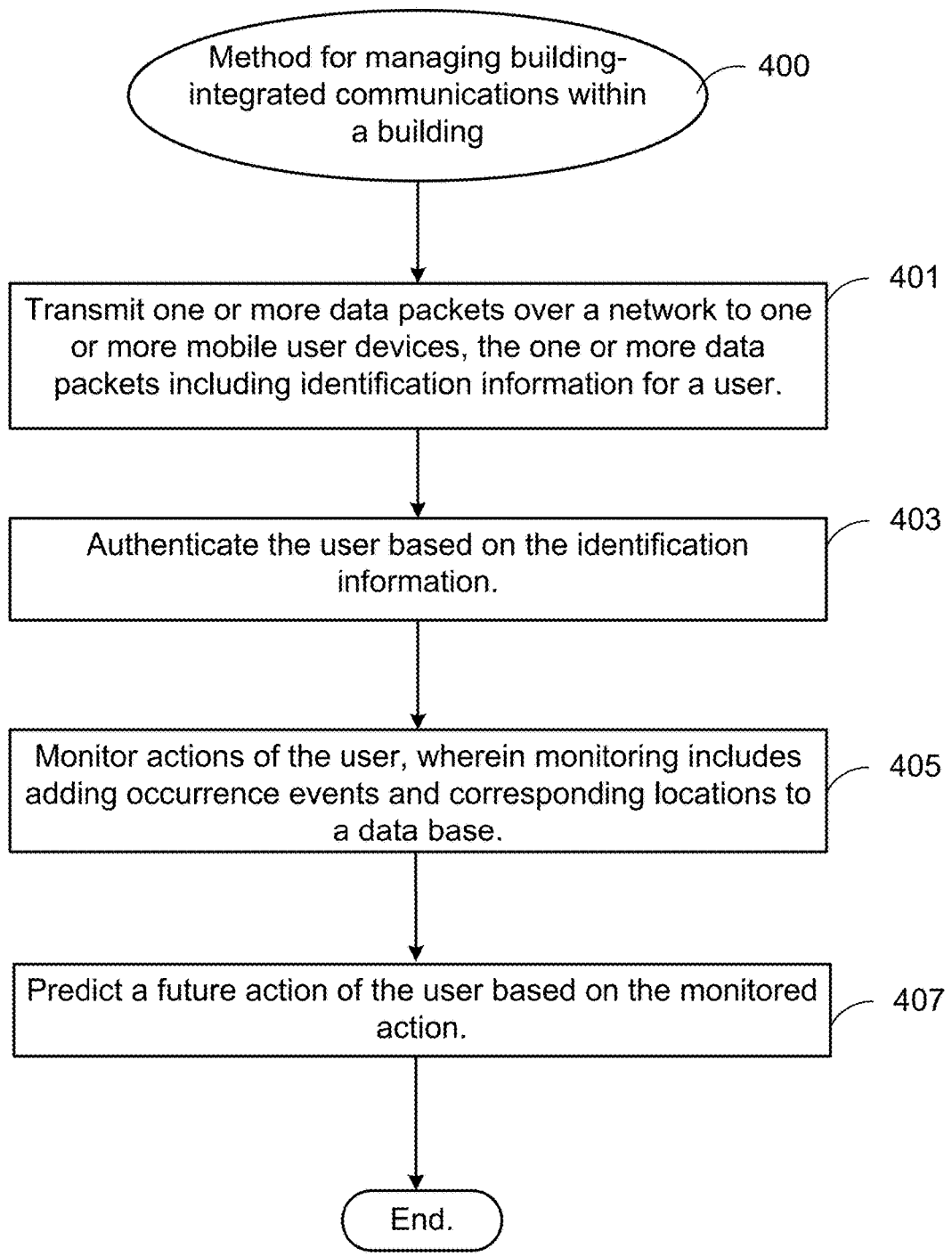
FIG. 4 illustrates an example method flow chart, in accordance with various embodiments of the present disclosure.

FIG. 4 illustrates an example flow chart for a method managing building-integrated communications within a building, in accordance with embodiments of the present disclosure. Method 400 only represents one possible method for implementing the systems described herein. Other possible implementations that include only a subset of the operations comprising method 400 may also be in accordance with embodiments of the specification.

Method 400 begins with transmitting (401) one or more data packets over a network to one or more mobile user devices, the one or more data packets including identification information for a user. Then, the user is authenticated (403) based on the identification information. Next, after authenticating the user, the actions of the user are monitored (405), wherein monitoring includes adding occurrence events and corresponding locations to a data base. Last, a future action of the user is predicted (407) based on the monitored actions.

In some embodiments, authenticating the user includes generating a user identification token based on the identification information. In some embodiments, predicting the future action includes utilizing a rule based modeling system. In some embodiments, method 400 further comprises generating a personalized real-time feed for the user. In some embodiments, method 400 further comprises storing aggregated data from multiple sources on cloud-based storage. In some embodiments, predicting the future action includes utilizing machine learning techniques using a neural network. In some embodiments, a user interface is configured to allow for centralized access to all data related to the building, personalization of data feeds for the user based on the location of the user within the building, and push notifications for the user based on the user's location within the building.

Figure 5:
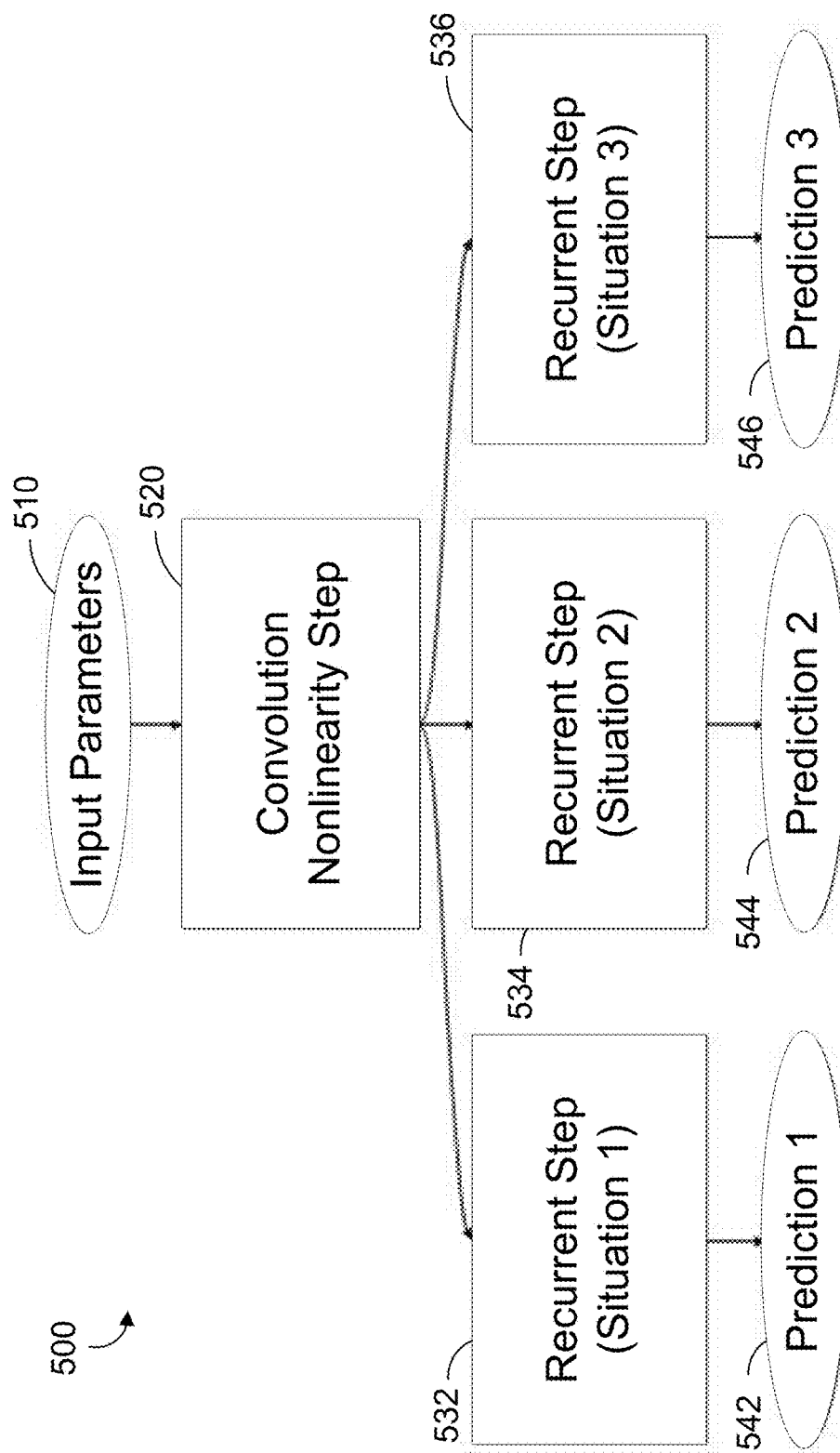
FIG. 5 illustrates one example of a neural network system that may make multiple predictions, in accordance with one or more embodiments of the present disclosure.

In some embodiments, a neural network, may be able to make multiple types of predictions. Examples of the various types of predictions may include, but are not limited to: actions of the user during the day, actions of the user during the night, actions of the user during certain weather, etc. In various embodiments, substantial sharing of parameters occurs between different layers. In some embodiments, some layers may share parameters between different types of predictions, while other layers may have distinct sets of parameters for each type of prediction. FIG. 5 is an illustration of one example of a neural network 500 that may make multiple types of predictions, in accordance with one or more embodiments. Neural network 500 includes input parameters 510, convolution-nonlinearity step 520, recurrent step 532, recurrent step 534, recurrent step 536, output prediction 542, output prediction 544, and output prediction 546. In some embodiments, input parameters 510 may be input as third-order tensors into convolution-nonlinearity step 520. Parameter tensors within convolution-nonlinearity step 520 are shared between prediction types. For example, there may be only one tensor used for convolution nonlinear step 520, regardless of how many different types of objects are being detected by neural network 500.

The output of convolution-nonlinearity step 520 may be third-tensor output. This output may then be converted to a first-order tensor and input into recurrent steps 532, 534, and 536. Each recurrent step 532, 534, and 536 may output predictions 542, 544, and 546, respectively. Each output 542, 544, and 546 corresponds to one or more predictions that identify one possible user action. For example, output 542 may comprise predictions for when it is raining. Output 544 may comprise predictions for when the user enters the building in the morning. Output 546 may comprise predictions for when the user receives a package but is not in the building. Parameter tensors may be shared within each recurrent step, but may not be shared between recurrent steps.

In some embodiments, after the neural network has been sufficiently trained (using a threshold number of datasets), the neural network can then make new predictions in situations that the system has never encountered during training. In such embodiments, the new situations resemble or are in the same category as identified situations during the training phase. For example, if one identified situation in the training sets is what the user does when he walks in the door in the morning, then the neural network, in an inference mode, may predict what the user will do when the user walks in the door at night, even if the neural network system has never encountered the situation where the user walks in the door at night before. This is because repeated passes of known input into the neural network trains the neural network to recognize different versions of the situations as long as a threshold level of similarity exists. In some embodiments, such a threshold is determined by factor comparisons or variable differences. In some embodiments, such thresholds for determining whether a situation leads to a prediction are automatically set and/or inherently learned by the neural network system through training and not by humans setting threshold values.

Figure 6:
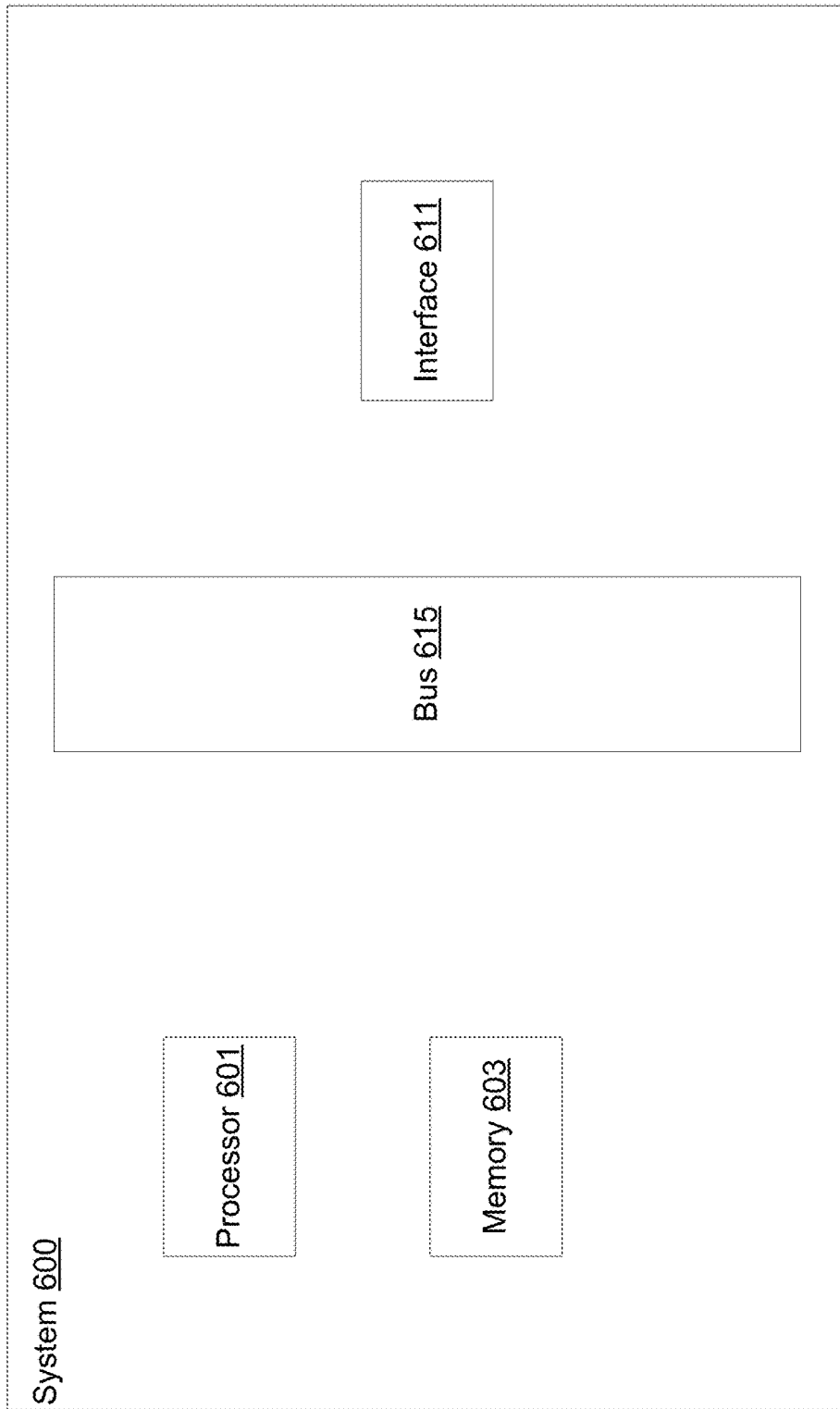
FIG. 6 illustrates a particular example of a system that can be used with various embodiments of the present disclosure.

Various computing devices can implement the methods described. For instance, a mobile device, computer system, etc. can be used to generate artificially rendered images. With reference to FIG. 6, shown is a particular example of a computer system that can be used to implement particular examples of the present disclosure. For instance, the computer system 600 can be used to any of the methods according to various embodiments described above. According to particular example embodiments, a system 600 suitable for implementing particular embodiments of the present disclosure includes a processor 601, a memory 603, an interface 611, and a bus 615 (e.g., a PCI bus). The interface 611 may include separate input and output interfaces, or may be a unified interface supporting both operations. When acting under the control of appropriate software or firmware, the processor 601 is responsible for such tasks such as optimization. Various specially configured devices can also be used in place of a processor 601 or in addition to processor 601. The complete implementation can also be done in custom hardware. The interface 611 is typically configured to send and receive data packets or data segments over a network. Particular examples of interfaces the device supports include Ethernet interfaces, frame relay interfaces, cable interfaces, DSL interfaces, token ring interfaces, and the like.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 600 uses memory 603 to store data and program instructions and maintained a local side cache. The program instructions may control the operation of an operating system and/or one or more applications, for example. The memory or memories may also be configured to store received metadata and batch requested metadata.

Because such information and program instructions may be employed to implement the systems/methods described herein, the present disclosure relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present disclosure.

While the present disclosure has been particularly shown and described with reference to specific embodiments thereof, it will be understood by those skilled in the art that changes in the form and details of the disclosed embodiments may be made without departing from the spirit or scope of the disclosure. It is therefore intended that the disclosure be interpreted to include all variations and equivalents that fall within the true spirit and scope of the present disclosure.

What is claimed is:

1. A building-integrated communication system, comprising:
   a building;
   one or more processors;
   memory; and
   one or more programs stored in the memory, the one or more programs comprising instructions for:
      receiving one or more data packets over a network from one or more mobile user devices, the one or more data packets including identification information for a user;

authenticating the user based on the identification information, wherein the user is authenticated using a login token comprising a data structure storing key value fields for authentication, the key value fields including: a user identification (ID) field, a user permissions field, an expiration timestamp, and a hash of all of the key value fields; and after the user has been authenticated, monitoring actions of the user, wherein monitoring includes adding occurrence events and corresponding locations to a data base; and predicting a future action of the user based on the monitored actions, wherein the prediction predicts the actions that the user would perform at the specific location, wherein the prediction is performed using a neural network.

2. The system of claim 1, wherein authenticating the user includes generating a user identification token based on the identification information.

3. The system of claim 2, wherein predicting the future action includes utilizing a rule based modeling system.

4. The system of claim 1, wherein the one or more instructions further comprises generating a personalized real-time feed for the user.

5. The system of claim 1, wherein the system uses cloud-based storage for data aggregation from multiple sources.

6. The system of claim 1, wherein predicting the future action includes utilizing machine learning techniques using a neural network.

7. The system of claim 1, further comprising a user interface to allow for centralized access to all data related to the building, personalization of data feeds for the user based on the location of the user within the building, and push notifications for the user based on the user's location within the building.

8. A method managing building-integrated communications within a building comprising:

receiving one or more data packets over a network from one or more mobile user devices, the one or more data packets including identification information for a user;

authenticating the user based on the identification information, wherein the user is authenticated using a login token comprising a data structure storing key value fields for authentication, the key value fields including: a user identification (ID) field, a user permissions field, an expiration timestamp, and a hash of all of the key value fields; and after the user has been authenticated, monitoring actions of the user, wherein monitoring includes adding occurrence events and corresponding locations to a data base; and predicting a future action of the user based on the monitored actions, wherein the prediction predicts the actions that the user would perform at the specific location, wherein the prediction is performed using a neural network.

9. The method of claim 8, wherein authenticating the user includes generating a user identification token based on the identification information.

10. The method of claim 9, wherein predicting the future action includes utilizing a rule based modeling system.

11. The method of claim 8, further comprising generating a personalized real-time feed for the user.

12. The method of claim 8, further comprising storing aggregated data from multiple sources on cloud-based storage.

13. The method of claim 8, wherein predicting the future action includes utilizing machine learning techniques using a neural network.

14. The method of claim 8, wherein a user interface is configured to allow for centralized access to all data related to the building, personalization of data feeds for the user based on the location of the user within the building, and push notifications for the user based on the user's location within the building.

15. A non-transitory computer readable storage medium storing one or more programs configured for execution by a computer, the one or more programs comprising one or more instructions for:

receiving one or more data packets over a network from one or more mobile user devices, the one or more data packets including identification information for a user;

authenticating the user based on the identification information, wherein the user is authenticated using a login token comprising a data structure storing key value fields for authentication, the key value fields including: a user identification (ID) field, a user permissions field, an expiration timestamp, and a hash of all of the key value fields; and after the user has been authenticated, monitoring actions of the user, wherein monitoring includes adding occurrence events and corresponding locations to a data base; and predicting a future action of the user based on the monitored actions, wherein the prediction predicts the actions that the user would perform at the specific location, wherein the prediction is performed using a neural network.

16. The non-transitory computer readable medium of claim 15, wherein authenticating the user includes generating a user identification token based on the identification information.

17. The non-transitory computer readable medium of claim 16, wherein predicting the future action includes utilizing a rule based modeling system.

18. The non-transitory computer readable medium of claim 15, wherein the one or more instructions further comprises generating a personalized real-time feed for the user.

19. The non-transitory computer readable medium of claim 15, wherein the one or more instructions further comprises further comprising storing aggregated data from multiple sources on cloud-based storage.

20. The non-transitory computer readable medium of claim 15, wherein predicting the future action includes utilizing machine learning techniques using a neural network.

* * * * *